(12) United States Patent
Kanada

(10) Patent No.: US 9,878,492 B2
(45) Date of Patent: Jan. 30, 2018

(54) 3D PRINTING METHOD THAT ENABLES ARRAYING HORIZONTAL FILAMENTS WITHOUT SUPPORT

(71) Applicant: Yasusi Kanada, Tokyo (JP)

(72) Inventor: Yasusi Kanada, Tokyo (JP)

(*) Notice: Subject to any disclaimer, the term of this patent is extended or adjusted under 35 U.S.C. 154(b) by 188 days.

(21) Appl. No.: 14/726,640

(22) Filed: Jun. 1, 2015

(65) Prior Publication Data
US 2015/0367571 A1    Dec. 24, 2015

(30) Foreign Application Priority Data
Jun. 20, 2014    (JP) .................................. 2014-126753

(51) Int. Cl.
| | |
|---|---|
| B29C 41/52 | (2006.01) |
| B29C 67/00 | (2017.01) |
| B29C 47/92 | (2006.01) |
| B29C 64/393 | (2017.01) |
| B29C 64/118 | (2017.01) |
| B29C 47/00 | (2006.01) |
| B29C 47/08 | (2006.01) |
| B33Y 10/00 | (2015.01) |
| B33Y 40/00 | (2015.01) |
| B33Y 30/00 | (2015.01) |

(52) U.S. Cl.
CPC ...... B29C 67/0055 (2013.01); B29C 47/0014 (2013.01); B29C 47/0866 (2013.01); B29C 47/92 (2013.01); B29C 64/118 (2017.08); B29C 64/393 (2017.08); B29C 2947/9258 (2013.01); B29C 2947/92619 (2013.01); B29C 2947/92704 (2013.01); B29C 2947/92942 (2013.01); B33Y 10/00 (2014.12); B33Y 30/00 (2014.12); B33Y 40/00 (2014.12)

(58) Field of Classification Search
CPC ..... B29C 41/02; B29C 41/52; B29C 47/0014; B29C 47/92; B29C 67/0055; B29C 67/0088; B29C 67/0092; B29C 2947/9258; B29C 2947/92619; B29C 64/118; B29C 64/393
USPC .............................. 264/40.1, 40.7, 308, 317
See application file for complete search history.

(56) References Cited

U.S. PATENT DOCUMENTS

| | | | |
|---|---|---|---|
| 5,136,515 A | 8/1992 | Helinski | |
| 2013/0209600 A1* | 8/2013 | Tow ..................... | B29C 67/0074 425/375 |
| 2014/0291886 A1* | 10/2014 | Mark .................. | B29C 67/0055 264/163 |
| 2014/0311651 A1* | 10/2014 | Mech .................. | B29C 67/0055 156/64 |

(Continued)

*Primary Examiner* — Leo B Tentoni

(57) ABSTRACT

The problem to be solved is, when printing a 3D object by using a 3D printer of fused-deposition-modeling type or another type, to enable printing it even when the filament is not supported from underneath by avoiding filament drop by generating force to push the extruded filament to the neighbor filament, and to enable arraying the filaments to a horizontal direction.

To avoid filament drop, force that pushes the newly extruded filament to the neighboring filament is generated, and filament drop is avoided. To do so, compression or extension power is generated by controlling the filament cross section by controlling the filament cross-section (i.e., the extrusion amount) and stiffness of the filament is controlled by controlling the temperature or light.

6 Claims, 2 Drawing Sheets

(56) References Cited

U.S. PATENT DOCUMENTS

2015/0197062 A1\* 7/2015 Shinar ................ B29C 67/0088
700/98

\* cited by examiner

3D PRINTING METHOD THAT ENABLES ARRAYING HORIZONTAL FILAMENTS WITHOUT SUPPORT

BACKGROUND OF THE INVENTION

Basic technology of 3D printers of so-called fused-deposition-modeling type, which use ABS resin or PLA resin filament, is described in the U.S. Pat. No. 5,136,515 by Richard Helinski. In addition, there are other types of 3D printers that use material that is in gel-state in room temperature but becomes solid by heat or light. By using such technologies, object models to be printed are sliced to thin layers, and each layer is formed by arraying filament horizontally, and the layers are stacked.

Upper-layer filaments must be supported either by the print bed, by lower-layer filaments, or by support material, so they do not usually be placed (printed) appropriately without support. However, under certain conditions, they can be supported by filaments in oblique direction so they can overhang, but the overhang angle is restricted; that is, the angle must be smaller than 60 (or 75) degrees so it is not possible to array filaments horizontally (i.e., 90 degrees angle).

BRIEF SUMMARY OF THE INVENTION

Problems to be Solved by this Invention

FDM-type 3D printers can stably print an object when it extrudes filament either on the print-bed, on printed filament, or on support material. However, if to use support material is the only method to support filament, several problems are caused. The first problem is that support material waists resources (i.e., support material). The second problem is that it is difficult to separate support material and object (filament) if they are made of the same material. The third problem is that, if different materials are used for support and object creation, two print heads are required for printing. This method restricts selection of a 3D printer and increases the printing cost. The fourth problem is that, if the object to be printed has a closed surface and the support is inside the surface (in other words, if the support material is enclosed by the closed surface), it is impossible to remove support material, so the weight of the printed object increases and the looks of the object becomes worse when the filament is transparent.

The purpose of this invention is, in fused deposition modeling (FDM) type 3D printers or other layering 3D printers, to enable printing and arraying filaments in a horizontal direction even when filaments are not supported from underneath and to enable printing an empty object with closed surface.

Means to Solve the Problems

The reason why it is not possible to array filament in a horizontal direction without support is that newly extruded filament does not stick to the neighbor filament and drops off. A method for solving the above problem is, thus, to generate force that sticks the newly extruded filament to the neighbor filament and to avoid dropping the filament. To generate such force, it is required to control the cross section, i.e., the amount of extruded filament appropriately, and it is required to generate force that compresses or extends the extruded filament. In addition, to keep required precision, it is required to control the temperature or lazar light so that the stiffness of filament is kept to an appropriate value.

The Effect of this Invention

By using the method of the present invention, in layering 3D printing, even when filaments are not supported from underneath, they can be arrayed horizontally.

DETAILED DESCRIPTION OF THE INVENTION (EMBODIMENT)

Outline of 3D Printing

In the method of 3D printing that layers filaments and creates shapes, a 3D printer extrudes melted filament from the nozzle of the print head either immediately over a print bed, over previously extruded filament, or over support material (which is material only for supporting filament and is removed after printing). To move the print head, a 3D printer usually has three stepping motors that control motions towards x, y, and z directions, or has three stepping motors that control a parallel-link mechanism. The motions of these motors are propagated to the print head by gears or belts. In addition, to extrude filament, a pinch roller clutches the filament, and it is driven by a stepping motor. The motion speeds of the print head and the filament are electronically controlled by the control system of the stepping motors.

In 3D printing, a supporter, i.e., either the print bed, solidified filament or support material, is usually underneath the filament being printed. However, by using certain method and conditions, it is possible to print correctly even when the object is supported from obliquely beneath, that means, in an overhung state. Thus, a shape such as a plate can be printed.

Conditions to be 3D-Printable

The conditions of 3D printability (i.e., the set of conditions that makes 3D printing possible) are the following two. The first condition is that previously printed filaments do not prevent the printing process. If there is filament between the nozzle of the print head and the location to be placed melted filament, the printing fails. The second condition is that a printed filament must be supported so that it remains to stay in the designed (placed) location. The supporter may be either the print bed, the previously printed filament, or support material (which is material used only for supporting filaments and to be removed after printing). The filament is not necessarily supported from underneath, but it can be supported (from oblique or horizontal direction) if it is pressed to a supporter in a horizontal (or oblique) direction. If extruded filament is placed at a location where the filament does not contact with any supporter, the filament goes out of the placed location and moves to a downward or horizontally out-of-place location. To be 3D-printable, both of these conditions must be satisfied.

Method of Preserving 3D-Printability

Figure 1:
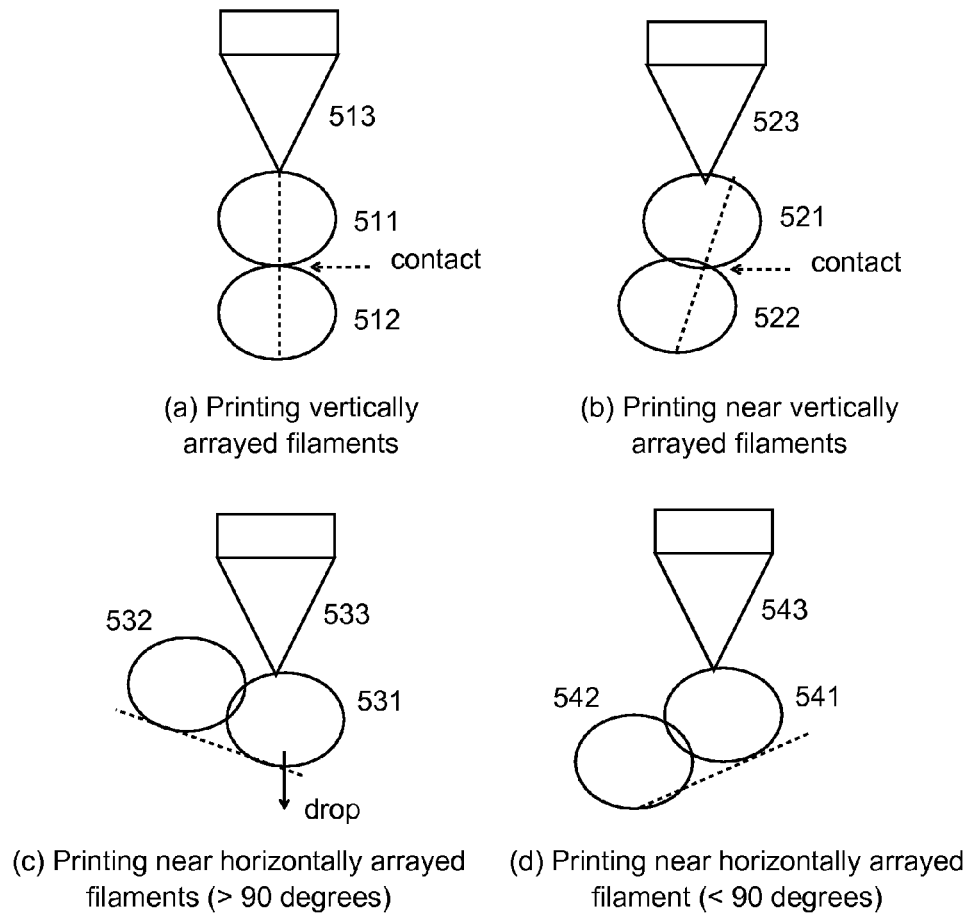
FIG. 1 explains the conditions that preserve the 3D-printability and the method for preserving the 3D-printability in the embodiment of this invention.

A method for preserving 3D-printability is explained using FIG. 1. When the direction of arraying (stacking) filaments is vertical, an upper filament 511 is pressed to a lower filament 512 so they are bonded. Because the shape of filament cross-section immediately after extrusion is close to a circle, by pressing and contacting to the neighbor filament, the shapes of filament 511 and 512 become closer to an ellipses. The lower end of the triangle 513 shows the location of the nozzle.

When the direction of arraying filaments is close to the vertical direction (as shown in FIG. 1(b)), the relationships between the filament 521 and 522 are mostly the same as the previously explained case, i.e., vertical case. So there will be no problem in this 3D printing. However, when the direction of arraying filaments are close to a horizontal direction and the angle between the centers of the filaments is negative, that is, a filament printed later is placed obliquely downward (FIG. 1(c)), the filaments 531 and 532 are not easily bonded because the order is opposite to normal cases, so it is difficult to form the correct shape without reversing the print order. Even when the angle of neighboring filaments are positive (FIG. 1(d)), if the angle is small (i.e., close to horizontal), a problem that excess filament may wave or the upper filament may easily be dropped off without contacting to the lower filament occurs. In addition, even if neighboring filaments are contacted but not pressed, they might cause a problem that they are not bonded.

To solve the above problem, one of the following three methods can be applied. First, if the angle between the centers of the filaments are positive, the following methods can be applied and the object may become 3D-printable. That is, the cross section is adjusted (that is, these methods add a control that aim to adjust the cross section) and the upper and the lower filaments is contacted by applying one of these methods. There are three methods to increase the cross section. The first method is to increase the filament extrusion velocity. Unfortunately, if the filament extrusion velocity is increased, the filament may be waved or bended and it might not contacted to the neighbor filament. So two more alternative methods can be available. The second method for increasing the cross section is that, instead of increasing the extrusion amount, the cross section is increased by decreasing the nozzle motion velocity. By using this method, it becomes possible to increase the cross section without changing the filament extrusion velocity, it is effective when there is delay between the change of the extruder motion and the change of filament extrusion speed; that is, when the extrusion velocity is adjusted by the control system, the extrusion velocity does not immediately follows the control. However, although this method can reduce the waving of filament but it is difficult to eliminate the waving completely. The third method for increasing the cross section is that, by installing multiple nozzles (print heads) that have different inner diameters to the 3D printer, and the head with a larger nozzle is selected when printing with larger cross section and the head with a smaller nozzle is selected when printing with smaller cross section.

Figure 2:
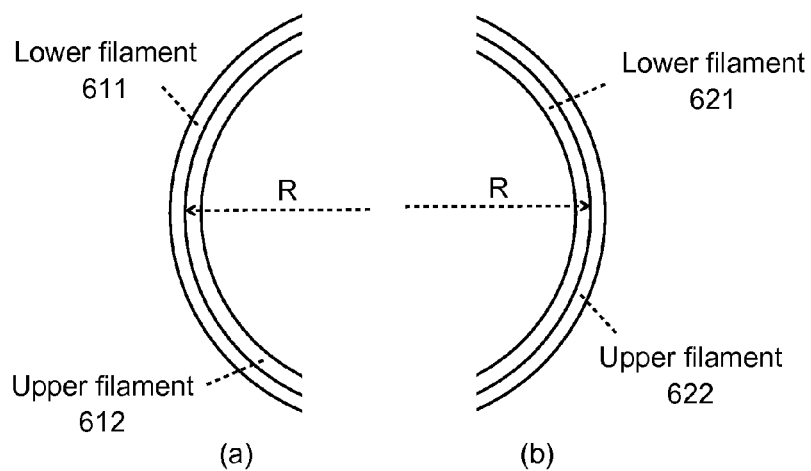
FIG. 2 explains the method for bonding filaments when the direction of the filament array is close to horizontal and the angle between the centers of the filaments are non-negative in the embodiment of this invention.

To solve the above problem, secondly, when the filament is arrayed close to a horizontal direction and the angle between the centers of the filaments is non negative, that is, a filament printed later is placed obliquely upward (or, including cases with small negative angle), the neighboring filaments are close to a horizontal direction as shown in FIG. 1(c) when printing, it is difficult to press and to bond the neighboring filaments. In this case, as shown in FIG. 2, the filaments can be bonded as follows.

The first case is explained by using FIG. 2(a). In FIG. 2(a), the lower filament 611 is on the left, and the upper filament 612 is on the right. The filament is assumed to bend to left, that is, the neighbor filament bends to the newly printed filament or the center of curvature radius is on the right, then the amount of filament is set to be slightly more than usual (excessive), i.e., the nozzle (print head) motion speed is slightly smaller compared with the filament extrusion speed. This makes the filament is pressed to the left and bonded. That is, the filament is pressed at the point that the extruded filament is solidified, so it is bonded. However, this process depends on the filament material, so the relationships between the filament extrusion speed and the nozzle motion speed must be dependent on the material.

The second case is explained by using FIG. 2(b). In FIG. 2(b), the lower filament 621 is on the left, and the upper filament 622 is on the right (as same as FIG. 2(a)). The filament is assumed to bend to right, that is, the neighbor filament bends to the opposite direction of the newly printed filament or the center of curvature radius is on the left, then the amount of filament is set to be slightly less than normal (lacked), i.e., the nozzle motion speed is slightly larger compared with the filament extrusion speed. This makes the filament is stretched and tensioned, pressed to the left, and bonded. That is, the filament is pressed at the point that the extruded filament is (partially or fully) solidified, so it is bonded to the (partially or fully) solidified filament. If the curvature of filament depends on locations, the amount of filament should be adjusted at each location according to the curvature. However, this process depends on the filament material, so the relationships between the filament extrusion speed and the nozzle motion speed must be dependent on the material.

As described above, it is difficult to preserve 3D-printability when the angle of the centers of filaments are negative, but it becomes printable if the order of printing is reversed, that is, if the direction and the order of filaments are reversed. If the filament is almost horizontal, they become printable by bonding filaments by using the method shown in FIG. 2 and explained above.

However, when the above described method of arraying filament in a horizontal direction is applied, the designed shape cannot be obtained or the precision becomes lower if the filament stiffness is low. To avoid this problem, one of the following methods or a combination of them can be used.

The first method for improving the precision of arraying filaments is based on a method of controlling the temperature (that is, this method adds a control that aims temperature adjustment). When filaments are solidified by cooling (that is, in the case of fused deposition modeling printers), the filaments can be cooled by forced air-cooling. In this case, the precision becomes better by more strongly cooling the filament that is several millimeter behind the print head by using an air nozzle. When the filaments are solidified by heating or lighting, the filament should be solidified (i.e., heated or lighted) at 0.1 to several millimeter behind the nozzle of the print head.

The second method for improving the precision of arraying filaments is based on a method of adjusting the filament cross-section (that is, adds a control that aims to vary the cross section). Based on the curvature of printing filament, the filament cross-section is increased or decreased as described above; however, because the precision is decreased by excessive increase or decrease of the filament, the increase or decrease should be limited to a certain range.

Figure 3:
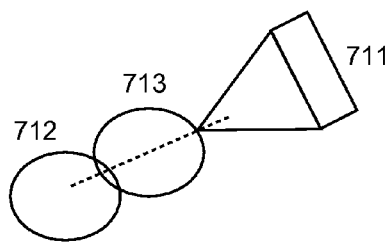
FIG. 3 explains the method for preserving 3D-printability by rotating the print head in the embodiment of this invention.

The method for preserving printability described above is applied when the print head extrude filament only to lower direction; however, if the print head can be rotated, a method described below can be applied. That is, as described in FIG. 3, by extruding filament to the direction of a line between the center of the lower filament 712 and the center of the upper filament 713 by rotating the print head 711, the filament 713 can be touched by the print head, so the filaments can be easily bonded together.

Cases that the Bottom Surface does not Contact the Ground

Figure 4:
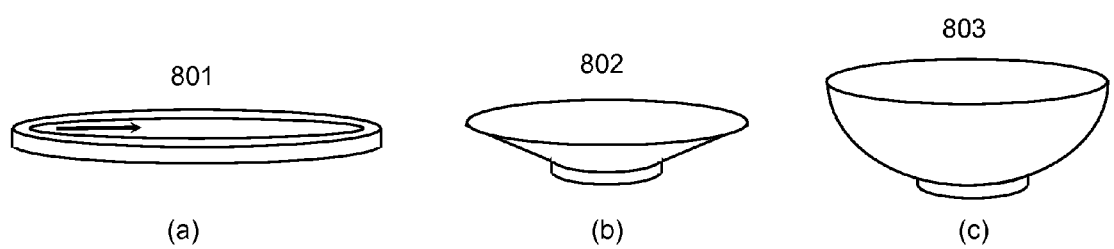
FIG. 4 explains the method of printing non-supported bottom in the embodiment of this invention.

As an application of the above described 3D-printability preservation method, a method for bottom-surface processing is explained by using FIG. 4. Filaments should be arrayed mostly horizontally when printing the bottom surface of an object. Depending on the type of 3D printers and the filament to be used, there are small asperity on the surface of the print bed so that transparency and shine are lost. For example, when using PLA for the print material, so-called blue tape, or masking tape used for painting, is often used to cover the print bed. The surface of this type of tape has fine asperity. In such a case, when printing the bottom of cups or similar objects, only the initially printed part is contacted to the print bed and the rest is not contacted to the print bed and, instead, mostly horizontally printed, transparency or brightness can be preserved. For example, as shown in FIG. 4, one or several layers of circles are printed on the print bed, following the printing method for arraying filament nearly horizontally, the bottom can be printed by drawing a spiral horizontally. That is, the print head moves in a spiral way and prints the bottom as a horizontal spiral. That is, to move the print head to the direction of the arrow drawn inside a circle (or a shape close to a circle) 801, and they draw the circle 801.

In such cases, when printing the bottom surface of dish 802 or cup 803, mostly horizontal bottom surface should be formed on grounded circle 801. It is a good method to print a bottom surface by starting to print from the circle described above and spirally printed from outside to inside. The above first method (FIG. 2(*a*)) can be applied in this case.

What are claimed are:

1. A method of 3D printing, which forms a 3D object by layering filaments extruded by a print head of a 3D printer;
wherein the most recently extruded filament touches only one previously extruded neighboring filament, is not supported from underneath;
comprising a control process that controls the relationships of the extrusion velocity of said most recently extruded filament and the motion velocity of said print head;
wherein said control process causes to contact said most recently extruded filament to said previously extruded neighboring filament and to bond said most recently extruded filament and said previously extruded neighboring filament.

2. A method of 3D printing according to claim 1; wherein said previously extruded neighboring filaments are convex to said most recently extruded filament, and
said control process varies said extrusion velocity; so that said extrusion velocity of said extruded filament becomes relatively smaller compared to said motion velocity of said print head in normal balance.

3. A method of 3D printing according to claim 1; wherein said previously extruded neighboring filaments are convex to said most recently extruded filament, and
said control process varies said extrusion velocity; so that tension toward the extruding direction to said extruded filament is generated.

4. A method of 3D printing according to claim 1; wherein said previously extruded neighboring filaments are concave to said most recently extruded filament, and
said control process varies said extrusion velocity; so that said extrusion velocity of said most recently extruded filament becomes relatively larger compared to the motion velocity of said motion velocity of said print head.

5. A method of 3D printing according to claim 1; wherein said control process varies the extrusion velocity so that further compressing power along the extruded direction to said most recently extruded filament is generated when said previously extruded neighboring filaments is convex to said most recently extruded filament.

6. A method of 3D printing according to claim 1; wherein said control process controls to locate said most recently extruded filament to a horizontal position to said previously extruded neighboring filament and
said process supports said most recently extruded filament from an oblique direction and forming part of the bottom of said 3D object.

\* \* \* \* \*